United States Patent

Dotzer et al.

[11] Patent Number: 6,081,645
[45] Date of Patent: Jun. 27, 2000

[54] CASSETTE ARRANGEMENT FOR CABLE SLEEVES OR DISTRIBUTORS WITH EACH CASSETTE BEING MOVABLE INDIVIDUALLY IN THE ARRANGEMENT

[75] Inventors: Peter Dotzer, Berg; Guenter Einsle, Munich; Ernst Mayr, Starnberg; Lothar Zetsche, Munich, all of Germany

[73] Assignee: Siemens Aktiengesellschaft, Munich, Germany

[21] Appl. No.: 09/089,732

[22] Filed: Jun. 3, 1998

[30] Foreign Application Priority Data

Jun. 3, 1997 [DE] Germany ............... 197 23 250

[51] Int. Cl.$^7$ .................................. G02B 6/00
[52] U.S. Cl. .................................. 385/135
[58] Field of Search ................... 385/134–137, 385/147

[56] References Cited

U.S. PATENT DOCUMENTS 4,832,436  5/1989  Goto et al. .
5,363,466  11/1994 Milanowski et al. .
5,402,515  3/1995  Vidacovich et al. .
5,617,501  4/1997  Miller et al. ............... 385/134

FOREIGN PATENT DOCUMENTS 0 215 668   3/1987   European Pat. Off. .
0 557 187   8/1993   European Pat. Off. .
42 09 907   9/1993   Germany .
44 39 853 A1 5/1996  Germany .
WO 96/30794 10/1996  WIPO .
WO 97/19377 5/1997   WIPO .

*Primary Examiner*—Akm E. Ullah
*Attorney, Agent, or Firm*—Hill & Simpson

[57] ABSTRACT

A cassette arrangement for cable sleeves or distributors is composed of a plurality of cassettes for light waveguides. Each cassette is mounted for pivotable movement between a storage position and a working access position. Each cassette has a pair of deflection elements with circumferential channels for receiving the excess lengths of the light waveguides which are stored in the cassette.

12 Claims, 6 Drawing Sheets

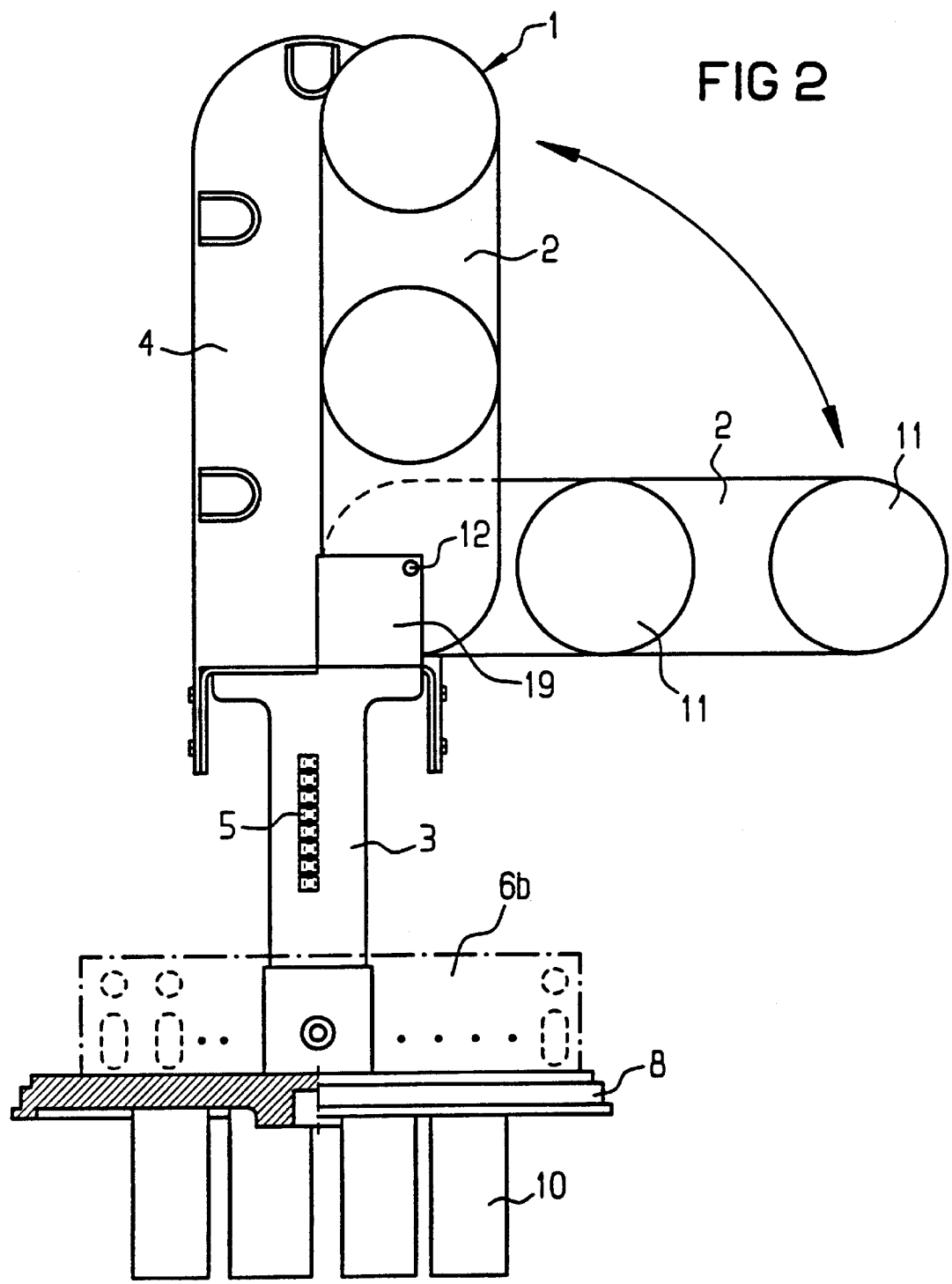

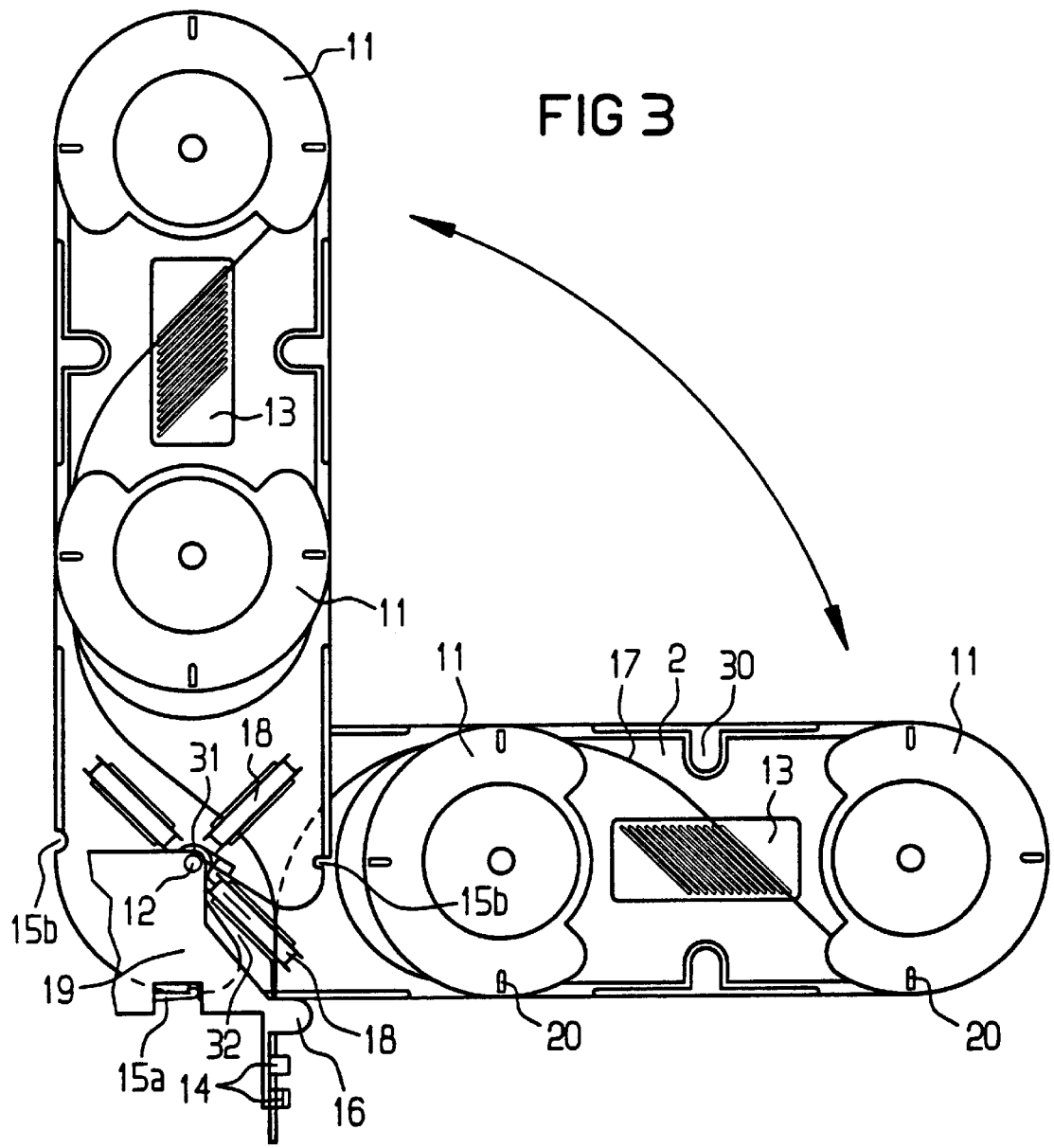

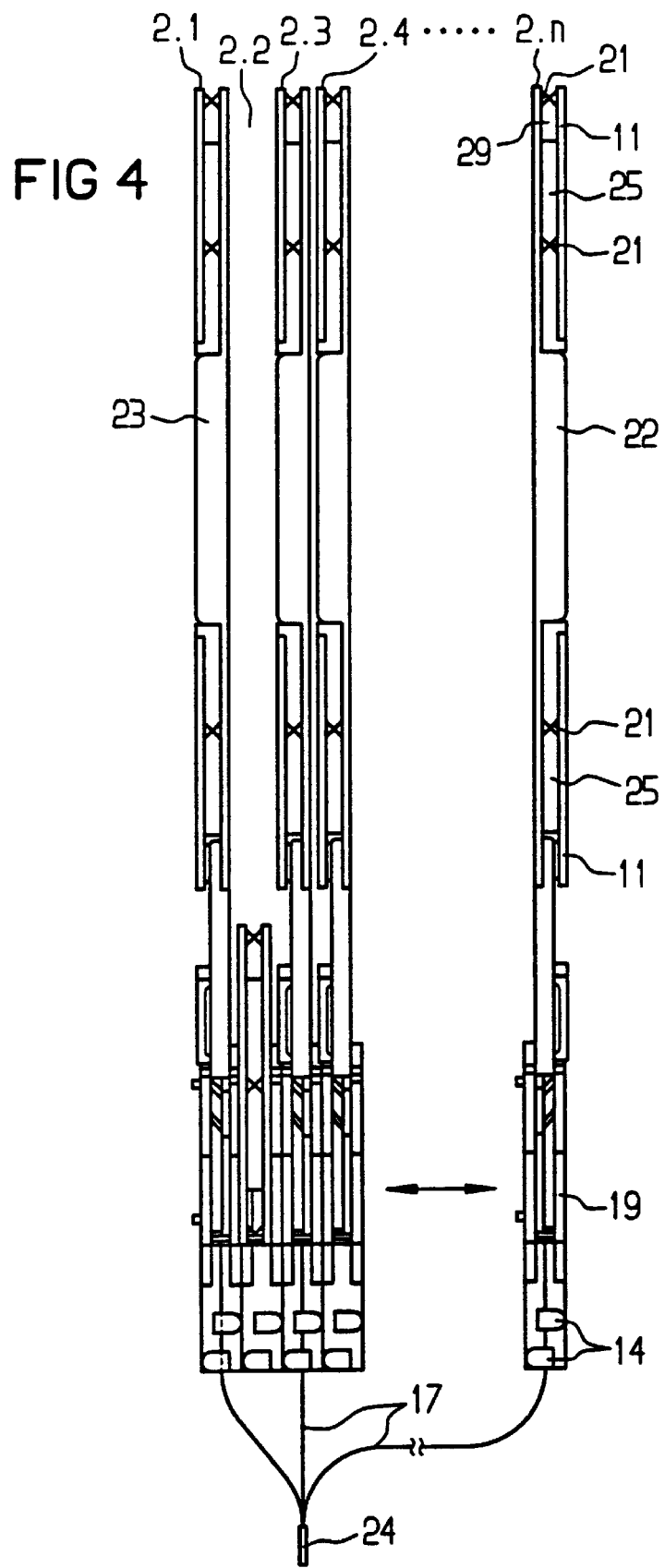

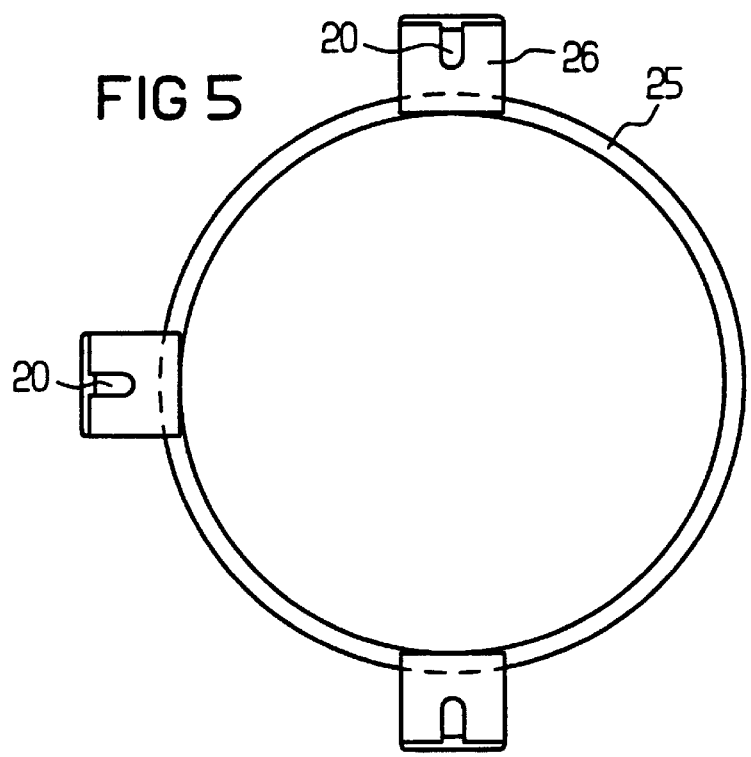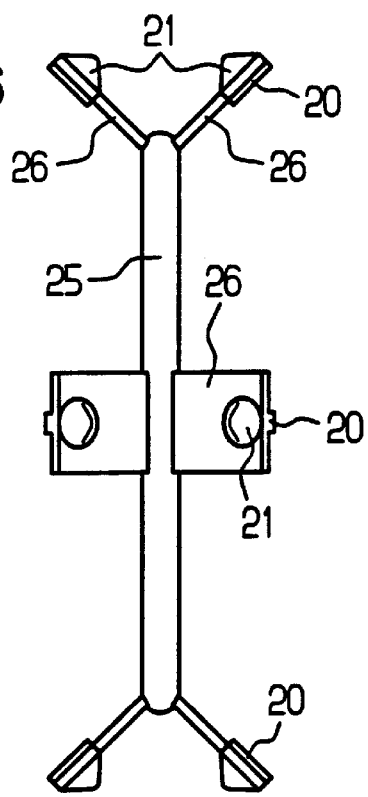

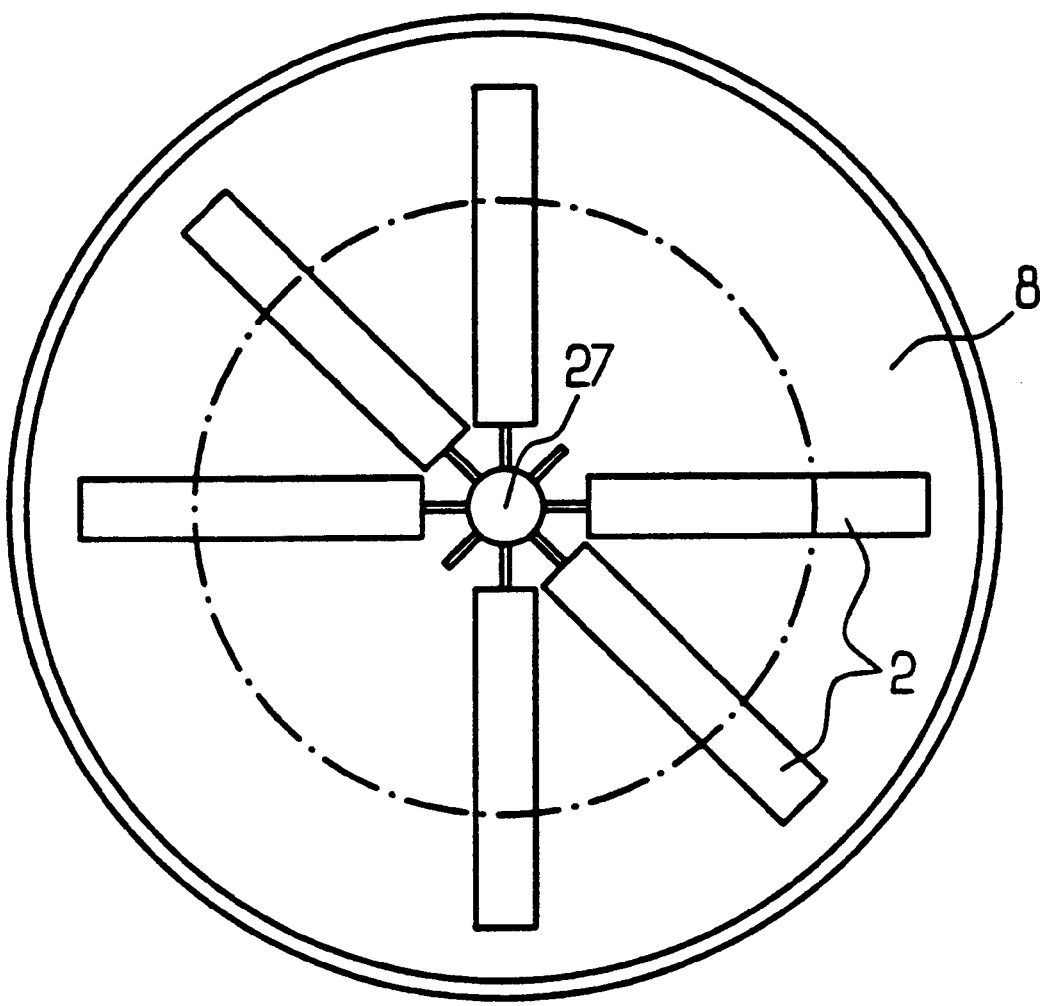

CASSETTE ARRANGEMENT FOR CABLE SLEEVES OR DISTRIBUTORS WITH EACH CASSETTE BEING MOVABLE INDIVIDUALLY IN THE ARRANGEMENT

BACKGROUND OF THE INVENTION

The present invention is directed to a cassette arrangement for cable sleeves or distributors, which arrangement is composed of a plurality of individual cassettes for the distribution and acceptance of light waveguides having an excess length thereof and also light waveguide splices.

German DE 44 39 853-A1 discloses a connecting, branching and distribution sleeve for light waveguide cables, wherein excess light waveguide lengths in the sleeve space are held by loop formation of the light waveguides in deflection pulleys or elements. The individual deflection pulleys are successively slipped on a pin and fixed. The excess length of the light waveguides is loosely guided in loops, and the splice holders are arranged within the loops of the waveguides. The removal of a light waveguide loop occurs by taking a splice holder out of the arrangement.

SUMMARY OF THE INVENTION

An object of the present invention is to provide an improved accessibility and manipulation upon removal of light waveguide loops, whereby the guidance and deposit can be suitable for individual fibers, multi-fiber loose buffers or bundles and for light waveguide ribbons.

This object is inventively achieved with a cassette arrangement of the above type having spaced apart deflection elements, such as two deflection elements or pulleys, with at least partially circumferential channels being arranged on every cassette at a distance from one another and that the cassettes are mounted at one end in a bearing block for pivotable movement and that each cassette can be individually pivoted out of the cassette union or arrangement and can be fixed with a releasable lock in the pivoted-out condition. The cassettes include clamping arrangements at their introduction for the light waveguides or light waveguide ribbons and the guide elements for the light waveguides or, respectively, the light waveguide ribbons are provided for motion compensation during the pivoting event.

Advantages with the cassette arrangement of the present invention are to be particularly seen wherein the light waveguides or light waveguide ribbons are introduced on the pivotable cassettes and can be potentially deposited with the splices. The pivoting of the cassettes out of and the locking in working position considerably improves the accessibility for service jobs, since only the respectively required cassette is pivoted out of the cassette union or block and wherein the individual light waveguides or light waveguide ribbons initially remain in their ordered position. Given normal cap sleeves, two levels of cassette blocks can be arranged above one another on a splice carrier. Each of the cassette blocks can contain up to 30 cassettes with a maximum of 12 splice connections per cassette or a total of 360 light waveguide connections per cassette level. Splice cassettes that, for example, should not be accessible can be correspondingly locked and closed off so that they are secured against open access. Such a cassette arrangement can be utilized in universal sleeves or distributor housings that can be mounted in the ground or on a pole as well.

Due to the guidance by the deflection pulleys on the respective cassette, both individual light waveguides as well as light waveguide ribbons can be guided, since an intersection between the deflection pulleys or elements is no necessary due to corresponding diagonal guides. This also enables that the splices are placed obliquely in the splice holder, which is illustrated in the Figures.

In addition to the cassette arrangement, a free space in which uncut light waveguides or reserve leads can be accommodated is provided on the cassette carrier.

The introduction of the light waveguides or light waveguides ribbons exposed in the sleeve space from the multi-fiber loose buffers or bundles into the individual cassettes occurs after the intercept via a simple clamp mechanism, so that the light waveguides or light waveguide ribbons are then introduced into the cassette into guide elements that allow a motion compensation of the light waveguides or light waveguide ribbons during a pivot or swivel event of the cassette. The cassettes are expediently combined into cassette blocks and are seated in a bearing block on a shaft. When a cassette is swivelled or pivoted out of the cassette block into a horizontal attitude, a fixing or, respectively, locking occurs that, in turn, can be unlocked after the work has been completed.

The insertion of the light waveguides or, respectively, light waveguide ribbons into at least partially circumferential channels of each of the deflection pulleys or elements occurs in a simple way, wherein a securing against unintentional removal of the light waveguides or light waveguide ribbons takes effect simultaneously with the insertion. The insertion and fixing is thus simple and time-saving.

For the splicing, the corresponding light waveguides or, respectively, light waveguide ribbons are then taken from the channels of the deflection pulleys and guided to the splicing apparatus. A removal of the cassette during splicing is thus not necessary. The return into the channels of the deflection pulleys and the depositing of the splice between the two deflection pulleys in the splice holder occurs after splicing. In the standard cassette technology, the entire cassette was removed from the carrier and deposited in the splicing apparatus, whereby certain difficulties, such as the removal of the cassette with respect to the additional length, were established for the delivery to the cassette. A considerably improved facilitation of the given service work is achieved by the technique of the present invention, whereby the surveyability of the overall system is preserved in every phase.

An arbitrary number of cassettes can be joined to one another, and correspondingly large lines can be compiled dependent on the size of the housing. The possibility of employment in large distribution systems is thereby also provided. In addition, each cassette can be mounted to face in the opposite direction in each of the bearing blocks so that access is also possible from the other side of the cassette.

Other advantages and features of the invention will be readily apparent from the following description of the preferred embodiments, the drawings and claims.

BRIEF DESCRIPTION OF THE DRAWINGS

FIG. 2 is a side view of a cassette arrangement of the present invention with portions in cross section for purposes of illustration showing the principles of pivoting from a storing position to a working position;

FIG. 3 is an end view of a cassette arrangement with one cassette being pivoted from the storage position to a working position;

FIG. 4 is a side view of the arrangement of FIG. 3;

FIG. 5 is a plan view of a retainer for the light waveguides which retainer is received in the deflection element of the present invention;

FIG. 6 is a side view of the retainer of FIG. 5; and

FIG. 7 is a plan view illustrating an arrangement of cassettes to extend radially from a central portion of the cap sleeve.

DESCRIPTION OF THE PREFERRED EMBODIMENTS

Figure 1:
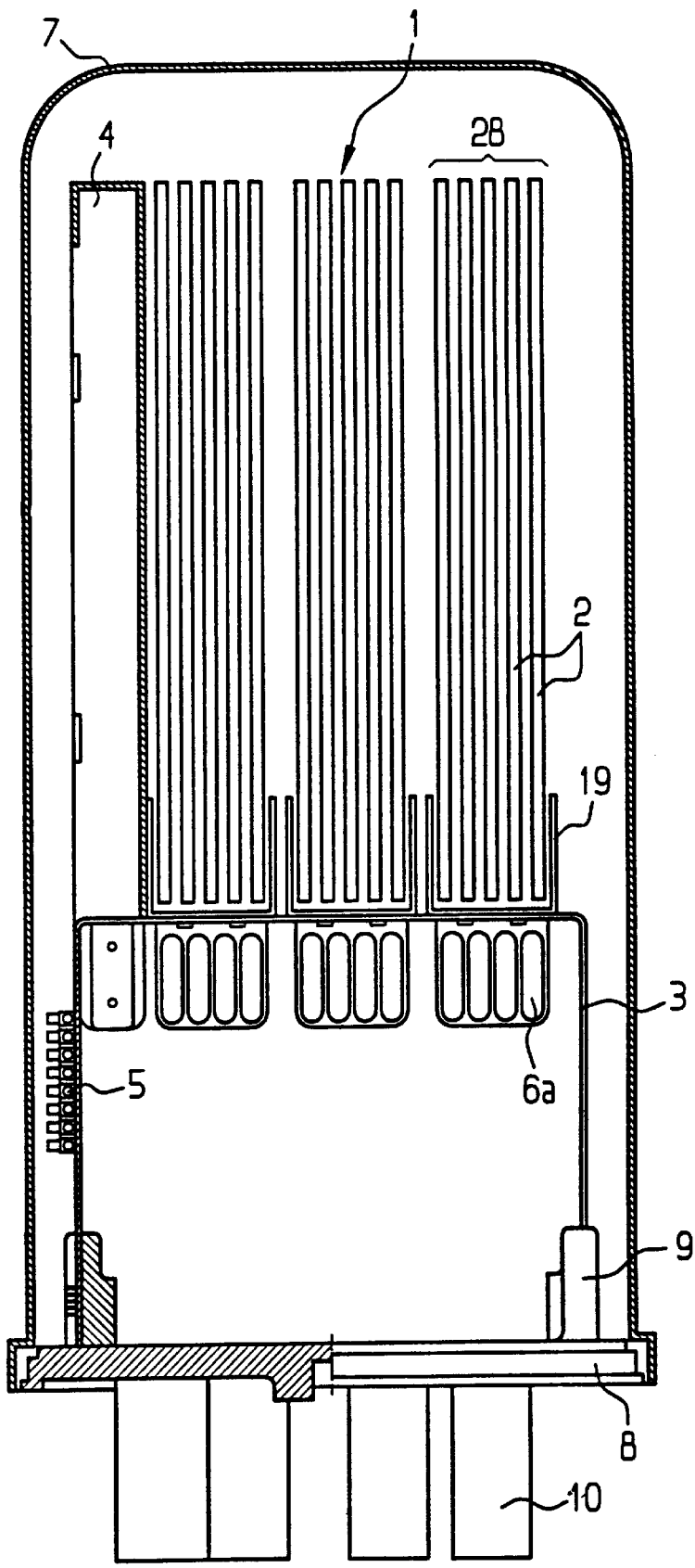
FIG. 1 is a cross sectional view with portions in elevation for purposes of illustration of a cassette arrangement of the present invention within a cap sleeve.

The principles of the present invention are particularly useful when incorporated in a cassette arrangement, generally indicated at 1 in FIG. 1, for example, which are arranged on a seal member 8 of a cap sleeve 7. To this end, a cassette carrier 3 is arranged on the seal member 8 in appropriate holders 9, which are preferably swivelable. Bearing blocks 19 in which the cassettes 2 are combined in cassette blocks 28 are arranged on this cassette carrier 3, wherein each individual cassette is rotatably mounted in the bearing blocks. Additional intercept devices 6a in which the light waveguide mutli-fiber loose bundles can be intercepted and held are expediently arranged in the cassette carrier 3. From here, the light waveguides or light waveguide ribbons are introduced into individual cassettes 2. Additional clamp elements 5 that, for example, can be employed for clamping lines to ground are provided on the cassette carrier 3. In addition, a receptacle container 4, for example in the form of a frame with a corresponding retainer for uncut light waveguide leads, light waveguide ribbons or light waveguide reserve leads, is located on the cassette carrier 3. Here, the cassettes 2 are arranged to extend parallel next to one another in the cassette blocks 28. It is also shown that the seal member 8 has introductions for the light waveguide cables which are provided with introduction connections 10 that are sealed in a traditional way, for example with appropriate shrink hoses or press-type seals.

As illustrated in FIG. 2, the principle of the present invention is that each of the individual cassettes 2 can be swivelled or pivoted out of a vertically arranged storage position of the arrangement 1 into a horizontal servicing or working position. It becomes clear that the two deflection pulleys or members 11 are fully accessible while the cassette is in the swivelled-out or working position so that the light waveguides proceeding therebetween can be correspondingly processed. The pivoting or swivelling occurs around a shaft 12 that is arranged in the bearing block 19 of the cassette carrier 3. A double-arrow indicates the pivoting direction. The arrangement of the receptacle container 4 for the acceptance of uncut light waveguides, light waveguide ribbons or reserve leads also is clear in this end view. It is indicated in this embodiment that the intercept devices 6b can also be directly attached to the seal member 8 so that the introduced light waveguide cables or light waveguide multi-fiber loose bundles are already fixed here.

More details of the structure of each of the cassettes is illustrated in FIG. 3, wherein the excess length of the light waveguides 17 between the two deflection elements 11 are guided in the circumferential channels on the cassette so that corresponding retainers prevent the light waveguides or, respectively, light waveguide ribbons from jumping out of these channels. These retainers are inserted into the channels so that only their catch noses or pads 20 on the outside can be seen in this Figure and are received in openings in the sides of the members 11. The light waveguides are guided diagonally between the two deflection elements 11, whereby the splices are held in obliquely arranged channels of an interchangeable splice holder 13. The light waveguides 17 first introduced into the clamping mechanism 14 are subsequently introduced into a guide element 18 that is provided on the cassette 2, which guide element prevents the light waveguides or, respectively, light waveguide ribbons from jumping out in an uncontrolled fashion but, on the other hand, also allows a motion compensation during the pivoting event of the cassette 2.

These guide elements 18, for example, are of a U-shaped arrangement, whereby the opening is expediently provided with an elastic element or is fashioned as a spring lip so that unintentional disengagement is prevented. In addition, bent-in angle tabs 30 are arranged at the edges of the cassette as further retaining elements for the light waveguides. In the limited condition of the swivelled-out or pivoted-out cassette 2, the locking in this servicing position occurs by snapping a catch nose 15a provided in the bearing block 19 into a catch channel or recess 15b of the cassette 2. After the servicing work has been finished, this locking can be unlocked and the cassette can then be pivoted back into the upright storage position in the bearing block 19.

Each cassette 2 has an introduction channel 32 at the end at which it is placed onto the shaft 12 in the bearing block 19. This introduction channel 32 tapers conically inward and comprises a catch mechanism of reinforcement 31 on the end that takes effect when slipped on so that the cassette snaps in on the shaft and will no longer fall off by itself. The catch mechanism, however, can be manually overcome when the cassette must be completely removed for servicing work. It is also shown that the catch notches 15b are present on both sides of the cassette so that the catch mechanism with the catch nose 15a also will take effect when the cassette is inserted after being turned through 180°, as shown with the cassette 2.n in FIG. 4, which is the farthest to the right.

As illustrated in FIG. 4, a cassette block is composed of a plurality of cassettes 2.1 through 2.n. It can be seen therefrom that a respective elastic ring 25 is inserted into the circumferential channel 29 of each of the deflection members 11, and this elastic ring 25 comprises outwardly directed leg pairs (not visible in this view), whose ends have elevations or projections 21 of elastic material directed toward one another. In this way, it is possible that the light waveguides or, respectively, the light waveguide ribbons can be introduced into the channel by being pressed in, whereby the light waveguides, however, can no longer unintentionally be disengaged from the channel. Moreover, grip-like angle pieces, flanges or tabs 22 or 23 are attached to the cassettes and these tabs can be grasped for the pivoting of the cassette out from the left or, respectively, from the right. The second cassette 2.2 from the left is shown in the servicing or working position. In this case, it is indicated that the light waveguides or, respectively, light waveguide ribbons 17 from a multi-fiber loose bundle 24 proceed for introduction to the cassettes 2.1 through 2.n, whereby the individual light waveguides or waveguide ribbons are fixed in clamp mechanisms 14. In this case, two oppositely directed angle bends are provided and the particular light waveguide or light waveguide ribbon is threaded through these members. The two oppositely-directed angle bends 14 are dimensioned such in length that it is no longer possible for the introduced light waveguide or, respectively, light waveguide ribbon to jump out from the installed position.

The ring 25, as best illustrated in FIGS. 5 and 6, is fashioned as a retainer for the light waveguides that are drawn into the circumferential channels of each of the deflection elements. The ring 25 is composed of elastic material so that the introduction can occur without difficulty by pulling up over the channel edges. In this case, three outwardly-directed leg pairs 26—26 are provided and each of the legs has an elevation or projection 21 which faces toward the projection on the other end. These elevations or projections resiliently touch one another when the retainer is drawn into the channel and the projections elastically close the channel, as mentioned hereinabove. The leg pairs 26 are additionally provided with outwardly-directed pads or elevations 20 that, during the drawing-in into the channel, are engaged into corresponding apertures of the deflection element, as shown in FIG. 3. In this way, the elastic retainer is secured against falling out and against turning.

As best illustrated in FIG. 6, each of the leg pairs 26—26, on their free ends, comprise the projections 21 with the catch elevations 20 on the opposite side. When the ring 25 is pulled into the channel of the deflection pulley, the leg pairs 26—26 are pressed together and form the elastic closure of the opening with the oppositely-directed projections 21. When the ring 25 is pulled into the channel, the catch elements 20, as mentioned above, are anchored in the catch openings of the deflection members.

Instead of arranging the cassettes in blocks, as illustrated in FIGS. 1–4, the cassette arrangement can have a star-like arrangement, as illustrated in FIG. 7, wherein the central cassette carrier 27 is then expediently provided, and this can likewise be arranged in the seal member 8 of the cable sleeve. Moreover, all disclosed features of the invention can likewise be utilized here in this embodiment, wherein the individual cassettes extend radially outward from the member 27, either individually or in groups.

Although various minor modifications may be suggested by those versed in the art, it should be understood that we wish to embody within the scope of the patent granted hereon all such modifications as reasonably and properly come within the scope of our contribution to the art.

We claim:

1. A cassette arrangement for cable sleeves and distributors, said arrangement being composed of a plurality of individual cassettes for the distribution and acceptance of light waveguides having excess lengths thereof and light waveguide splices, each of the cassettes including two deflection elements, each cassette being mounted at one end in a bearing block for pivotable movement in a plane of the cassette between a storage position and a working position, each cassette being individually movable from the storage position in the working position, each cassette comprising clamping mechanisms adjacent an introduction for the light waveguides, the cassettes being combined to form a cassette block in which the cassettes are arranged to extend parallel next to one another on a cassette carrier, the two deflection elements having a partially circumferential channel, a splice carrier for the acceptance of light waveguide splices being arranged between the two deflection elements so that splices are inserted in the splice holder and proceed diagonally relative to a longitudinal axis of the cassette, each of the deflection elements comprises a retainer for the light waveguides, said retainer being a ring of elastic material which is inserted in an engaging fashion into the channel of the deflection element, each ring having a plurality of outwardly-directed leg pairs having projections extending toward one another at the end of the legs, said projections lying resiliently against one another when the retainer is in the inserted condition so that the introduction of light waveguides and ribbons is possible but the independent disengagement is not possible, each cassette being fixed by a releasable catch nose being snapped into a catch channel of the cassette in the pivoted-out working position, and guide elements for the light waveguides being provided which compensate for motion during the pivoting of the cassette between the two positions.

2. A cassette arrangement according to claim 1, wherein the splice carrier is interchangeable and can be matched to the splice connections being employed.

3. A cassette arrangement according to claim 1, wherein the cassette carrier is mounted for pivotable movement.

4. A cassette arrangement according to claim 1, wherein the cassette carrier is secured to a seal member of a cable sleeve.

5. A cassette arrangement according to claim 1, wherein the cassettes are arranged in a star-shaped pattern around a central cassette carrier to extend radially outward therefrom.

6. A cassette arrangement according to claim 5, wherein the cassette carrier is mounted for pivotable movement.

7. A cassette arrangement according to claim 5, wherein the cassette carrier is secured to a seal member of a cable sleeve.

8. A cassette arrangement according to claim 1, which includes intercept mechanisms for the light waveguide cables being arranged at a cable introduction of a cassette carrier.

9. A cassette arrangement according to claim 8, which includes the cassette carrier being secured to a seal member of a cable sleeve.

10. A cassette arrangement according to claim 1, wherein the arrangement includes terminal posts for grounding leads.

11. A cassette arrangement according to claim 1, which includes a receptacle container for uncut light waveguides, light waveguide ribbons or light waveguide multi-fiber loose bundles being arranged on a cassette carrier.

12. A cassette arrangement according to claim 1, which has cassette blocks being arranged in a plurality of levels above one another.

* * * * *